Oct. 20, 1964    E. H. LEHMANN ETAL    3,153,785
TIME COMPRESSED DISPLAY
Filed July 27, 1961    2 Sheets-Sheet 1

INVENTOR.
ERNEST HENRY LEHMANN
CHARLES L. HUBER
BY
Stanley J. Cole
ATTORNEY

INVENTOR.
ERNEST HENRY LEHMANN
CHARLES L. HUBER
BY
ATTORNEY 3,153,785
TIME COMPRESSED DISPLAY
Ernest H. Lehmann, Rochester, and Charles L. Huber, Byron, N.Y., assignors to Xerox Corporation, Rochester, N.Y., a corporation of New York
Filed July 27, 1961, Ser. No. 127,366
9 Claims. (Cl. 343—5)

The present invention is concerned with optical information displays, and is described herein with particular reference to the processing and visual presentation of radar information. Although this invention is presently envisioned as particularly applicable to radar and is, therefore, described with relation thereto in order to facilitate a full understanding thereof, it is understood that the invention is not restricted or limited to radar applications.

In the radar art, efforts are continually being made to increase the effective range of installations within the limitation of practical and available power. One important criterion of effective range is the limit of range at which an operator can recognize a moving target, i.e., the fact that a target is moving. It has been shown that an operator can distinguish moving targets near the range limits of a radar system more readily if time compression techniques are used in place of a conventional and direct cathode ray tube "real time" display. A time compression display is one in which the operator is presented with a rapid sequence of images, each of which contains a full frame of radar information. This sequence if images constitutes a short history of the radar intelligence and is presented at a much more rapid rate than originally obtained by the radar receiver and originally presented on its cathode ray tube. In addition, the short history is presented repetitively, while the history is continually updated by having substituted for the oldest images in the sequence the current radar images as they are received. Thus, in accordance with this time compression technique, a given number of successive radar image frames, as for example those images obtained on a cathode ray tube from a PPI radar scan, are individually recorded and stored, and these images are then successively projected for viewing at a rate much more rapid than the actual radar frame or cycle time. For example, a radar cycle of scan may take 10 seconds. The present invention contemplates storing perhaps 20 radar frames, and then repetitively presenting these frames at a rate preferably exceeding the flicker perception rate of human vision, perhaps 24 per second, thereby presenting the recent radar history at 240 times its actual or "real time" reception rate. While this rapid repetitive presentation proceeds, as each current radar frame is received and recorded, it is substituted in the sequence for the oldest frame, thereby continually up-dating the presentation at the radar cycle rate.

The present invention relates to a novel method and apparatus for obtaining the time compression display of a succession of optical images, such for example as are obtained on the cathode ray tube of a radar receiver. More particularly, this invention relates to a xerographic approach to the time compression display of a succession of images.

The present invention contemplates the provision of a plurality of xerographic plates cooperating with a xerographic processing station and a xerographic image projecting station. Xerographic plates are photoconductive plates, usually fabricated from selenium. They are capable of obtaining a substantially uniform electrostatic charge on the surface thereof when exposed to a corona discharge in the absence of light; an electrostatic latent image may be obtained on the charged plate by exposing it to a light image and permitting the plate to discharge in accordance with the luminance pattern; and the latent image may be developed to visual form by causing a powder to adhere to the plate in the charged areas. The plates are thus xerographically processed by being first cleared of any prior image, then uniformly charged. The charged plates are subjected to a light image, rendering the photoconductor conductive in the illuminated areas, and permitting the charge to be conducted away in the illuminated areas or in proportion to the amount of illumination in a given area, thereby creating an electrostatic pattern or latent image corresponding to the light image. The latent image is thereafter developed on the plate by applying an electroscopic powder to the plate, which selectively adheres to the charged area, or adheres in a density proportional to the charge in a given area. The powder images thus created on the plates may be projected onto a viewing screen by impinging a convergent beam of light on the plate and focusing the reflection from the plate on a screen. The areas covered by powder absorb or disperse the light beam, while the exposed or clear plate surface areas, which are made to be highly reflective, appear as light areas on the screen. The specific xerographic apparatus and techniques per se form no part of the present invention, and accordingly are not described in detail herein. However, they are described in detail in the following United States patent applications, which are incorporated herein by reference: Serial No. 738,520 to Harold E. Clark et al., filed May 28, 1958, Image Projection; and, Serial No. 815,475 to Ernest Henry Lehmann et al., filed May 25, 1959, Improved Image Projection, now Patent U.S. 3,051,041.

In accordance with the present invention, a plurality of xerographic plates having powder images thereon are stored for projection. The sequence of powder images may be the successive images obtained from the cathode ray tube of a radar receiver, representing successive cycles of radar scan. This group of images are projected in rapid sequence upon a viewing screen, and the projection of the group, or the projection cycle, is presented repetitively. Simultaneously with the projection operation, the image sequence is continually up-dated by erasing the oldest image on the plates and xerographically applying the latest radar image thereto.

To facilitate the xerographic processing of a group of plates concurrently with the projection operation, the plates are formed with photoconductive films on their two surfaces. By this means, while one surface is being processed to apply the current radar image thereto, the opposite surface is available for projection of the radar images previously formed thereon. As the processing of each plate is completed, it is turned 180° to present the most recent radar image for projection, while the older image side of the plate is thus made available to be cleaned and reprocessed when it reaches the xerographic processing station during the cycle of operation of the system.

It is accordingly one object of the present invention to provide for the time compression display of a continuing sequence of information, with continual up-dating of the information displayed, and particularly as applied to radar image displays.

Another object of the present invention is to provide for such information display by xerographic techniques.

A further object of the present invention is to provide for the conversion of a real time visual display of a continuing sequence of images into a time compression display thereof, with repetitive presentation of a recent history of images, and a continual up-dating of the history by replacement of the oldest image in the history with a current image.

And still another object of the present invention is to provide for such conversion to a time compression display, and for said up-dating, by xerographic techniques.

Other objects and advantages of the present invention will become apparent to those skilled in the art from a consideration of the following detailed exemplary description of one embodiment of the present invention, had in conjunction with the accompanying drawings, in which like numerals refer to like or correspoding parts, and wherein.

Figure 1:
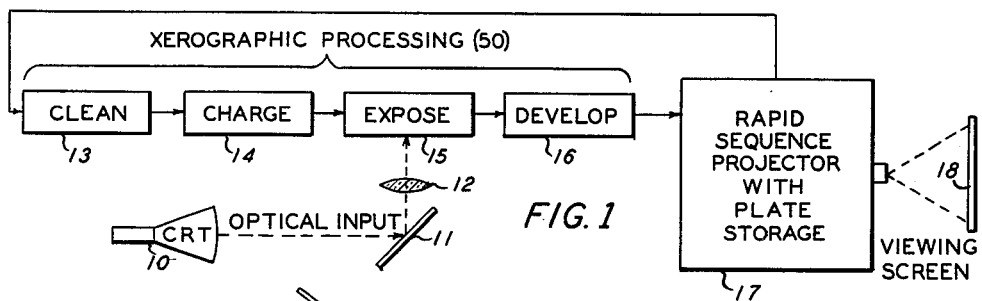
FIG. 1 is a flow diagram of the method of the present invention.

The general nature of the present invention is best understood by reference first to the flow diagram of FIG. 1. For purposes of illustration the present invention is described as applied to the processing and display of radar-derived information. To this end, the optical input to the present system is indicated as a cathode ray tube 10, which is the optical or visual output of a radar receiver. For each cycle of radar scan, one obtains a complete image frame on the screen of tube 10, and this image is indicated as applied through a mirror 11 and lens 12 to the "expose" stage 15 of the xerographic processing station of the system. Before being exposed to the radar image, however, each xerographic plate is first cleaned at 13 to remove any prior image, whereupon it is uniformly charged by corona discharge at 14, and then exposed to the radar image at 15 to create the electrostatic latent image of the optical radar image. The plate with a resultant electrostatic image is then developed by application of an electroscopic powder thereto at 16, the powder adhering selectively to the charged areas. The newly developed image is then entered into the projection and storage phase of the system, indicated by numeral 17. The entry of this current and most recent image into the projection sequence is accompanied by removal therefrom of the oldest image, which will be erased from the plate and a new image applied thereto in the xerographic processing phase of the system. The images thus stored at 17 are continually, sequentially, and rapidly projected onto screen 18, creating a repeating and continually current, rapid motion picture of an immediate past history of radar images. By the resultant time compressed, repetitive, and continually current visual presentation, slow changes in the image intelligence become more apparent. Consequently, when applied to radar, the operator may more readily be able to discern moving targets at the periphery of the radar range, and detect moving targets which could not be detected on a real time display as obtained directly from the radar screen 10.

Figure 2:
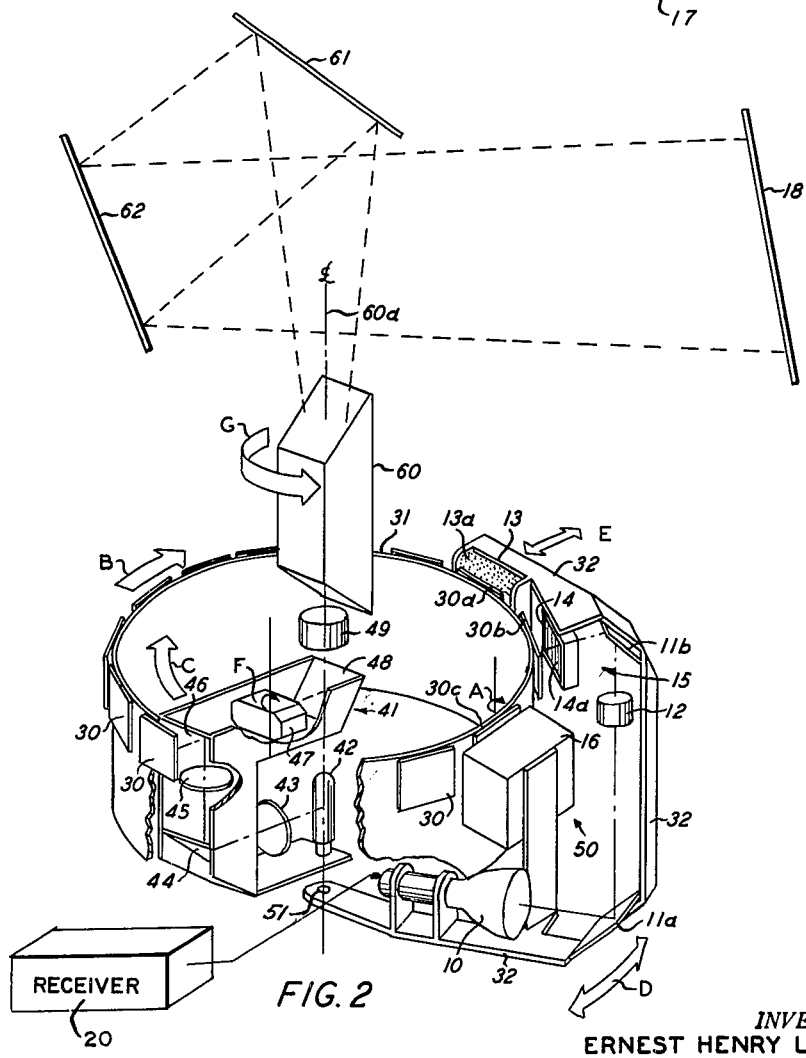
FIG. 2 is a partially schematic showing of one specific apparatus embodying the present invention.

One specific system for effecting the above described xerographic, continually current, time compression display of a continuing sequence of information, is illustrated in FIG. 2. A revolvably mounted turret is schematically indicated at 31. A plurality of xerographic plates 30 are circumferentially mounted on turret 31 for traveling the circuit described by the turret. In so doing, the plates 30 each sequentially pass the plate cleaning stage 13, as indicated by plate 30a, the charging stage 14, as indicated by plate 30b, the exposing stage 15, which may be separate from charging station 14 or combined therewith as in FIG. 2 for simultaneous charging and expose of the xerographic plates, and the developing station 16, as indicated by plate 30c. For reasons that will become apparent subsequently, after development of the image on plate 30c, the plate is turned 180° on its vertical axis as indicated by the arrow A.

Concentric with and internally of the plate turret 31 is a second, or optical, revolvably mounted turret schematically indicated at 40. Turret 40 carries a housing 41 containing an optical system for projecting an image from the inside surface of a plate 30 to the viewing screen 18, as will be more fully described subsequently.

By way of general operation, as thus far described, plate turret 31 continuously revolves in the direction of arrow B in order to advance the plates 30 through the xerographic processing station 50, comprising stages 13–16. Optical turret 40 continuously revolves in the direction of arrow C at a rate much more rapid than turret 31 to project the images on plates 30 in rapid sequence onto the viewing screen 18. Thus, the outside surfaces of xerographic plates 30 are processed through the xerographic stages 13–16, while the inside surfaces of these plates are optically projected onto the viewing screen 18. It was stated earlier that as each plate completes its passage through the xerographic processing station and after developing of the new image thereon at stage 16, the plate is turned on its vertical axis 180°. It will be appreciated that in this turning operation the oldest image in the optical projecting sequence is removed therefrom, i.e., turned to the outside of turret 31, and the most current image, just developed, is substituted therefor by being turned toward the inside of turret 31. Thus, as the inner or optical turret causes the optical projection system 41 to traverse repetitively the sequence of plates 30, during the entire 360° of traverse the images on the inside surfaces of all the plates on the outside turret 31 are available for projection. Also, while this projection traverse is occurring, and substantially independently thereof, the xerographic processing to up-date the sequence of images is simultaneously being effected on the outside surfaces of plates 30 as they pass through the indicated positions of plates 30a, 30b, and 30c.

In order to effect the foregoing two-sided xerographic plate operation, the plates 30 are fabricated with two thin selenium coatings, one on each surface, sandwiching a metal conductive plate therebetween. The central metal plate acts as an electrical surface contact and mechanical support for both selenium coatings in the xerographic processing and projection operations. The selenium coatings are formed with highly polished, mirror-like surfaces in order to be highly reflective in the projection of the xerographic images therefrom.

Considering the system as illustrated in FIG. 2 in greater detail, the entire xerographic processing station 50, comprising the cleaning stage 13, charging and exposing stages 14, 15, and developing stage 16, is mounted on a single chassis 32. The radar optical output cathode ray tube 10 receiving input from a receiver 20 is mounted at the bottom of the chassis 32, and the optical image from the phosphor screen is reflected by mirror 11a, through exposing lens 12 to mirror 11b, where the image is directed to the xerographic plate in the position of plate 30b. Before exposing to the optical image of cathode ray tube 10, the prior image on the processed side of plate 30 must be removed. This is accomplished at the cleaning stage 13 by means of a rotary brush 13a. After a plate in the cleaning position of plate 30a is cleaned, it is advanced by rotation of turret 31 relative to the processing station 50 to the position of plate 30b. At this position the plate is first exposed to a corona discharge from the grid 14a, to establish a uniform electrostatic charge over the outside selenium surface of the plate; then the plate is exposed to one complete radar cycle or image frame output from cathode ray tube 10, to create a charge pattern on the plate corresponding to the optical radar image. Thereafter the plate is advanced by further rotation of turret 31 relative to station 50 from the position of plate 30b to the position of plate 30c, where the charge pattern on the plate is developed by impinging an electroscopic powder on the plate surface, which adheres to the plate in the charged areas in densities proportional to the quantity of charge. After completion of the developing at stage 16, the plate is turned 180° on its vertical axis to place the new image in the projection sequence. The old image, now turned to the outside of turret 31, will be erased and a new image substituted therefor when the turret has cycled around to bring that plate to the beginning or cleaning stage 13 of the xerographic processing station 50.

The xerographic processing stages per se are generally well known in the art, and are therefore not shown or described in detail herein. However, selected specific embodiments thereof are set forth in the previously enumerated United States patent applications.

A complete cycle of radar scan takes a significant period of time, and the completion of an image frame on the screen of tube 10 for such scan cycle, of course, takes the same period of time. Therefore, in order to obtain an image of a complete cycle of scan on a xerographic plate 30, such plate must be exposed to the cathode ray tube image for the entire radar cycle time period. The plate obviously cannot be moved relative to the image during this exposure period. Since turret 31 is continuously moving in the direction of arrow B, it becomes necessary to lock in the xerographic processing station housing 32 with the turret movement during each plate exposure period. For this purpose, housing 32 is arranged to pivotally oscillate in the directions of arrow D about a center 51, and to reciprocate into and out of lock with the turret 31 in the directions of arrow E. Thus, for each plate exposure period, the processing station 50 locks in for rotation with turret 31. On completion of an exposure or radar cycle period, the station 50 moves away from the turret 31, and then in a direction counter to turret 31 a distance appropriate for registration of the processing stages with the next plate 30, whereupon the station 50 moves inwardly to lock in with the turret 31. Of course, the plate cleaning operation at plate position 30a, and the plate developing operation at position 30c, take place during said lock-in period simultaneously with the corona charging and exposure operation. The 180° rotation of a newly developed plate at position 30c takes place when the processing station moves outwardly away from turret 31 on the completion of the xerographic processing cycle for such plate.

Considering the xerographic image projection system in detail, the projection housing 41 carries a light source 42 from which a convergent beam of light is obtained by transmission through lens 43, reflection from mirror 44, and transmission through lens 45. The beam impinges upon a partially reflective and partially transmissive mirror 46, or other beam splitter. A portion of the beam is caused to reflect to the inside surface of the plate 30 immediately in front of the housing 41, from which a reflected light image of the xerographic powder image carried by the plate is obtained. This image is passed by partial mirror 46, and conveyed by an optical system comprising motion compensating prism 47, mirror 48, lens 49, dove prism 60, mirror 61, and mirror 62, to viewing screen 18.

Turret 40, which carries the optical projection housing 41, continuously revolves in the direction of arrow C at a much more rapid rate than turret 31, and therefore there is relative motion between the optical projection system and the xerographic plates 30. The motion compensating prism 47 is rotated about its center on axis 47a in the direction of arrow F to obtain a stationary optical image during the period of optical transmission of a given xerographic image to mirror 48. In addition to the relative motion between the turrets 31 and 40, projection housing 41 and hence the image on mirror 48 is continuously moving relative to the stationary viewing screen 18. In order to obtain a stationary image on screen 18 and compensate for this motion of housing 41, dove prism 60 is rotated about its vertical center on axis 60a, in the direction indicated by arrow G. Axis 60a is coincident with the rotational centers for mirror 48 and turrets 31 and 40, and with the pivot center 51 for the xerographic processing station housing 32 when housing 32 is locked in to turret 31.

From the foregoing description it will be appreciated that the circle of plates 30 mounted on turret 31 affords a sequence of xerographic powder reproductions of the radar images obtained from cathode ray tube 10. These images on the inside surfaces of the plates 30 are continuously, rapidly, and repetitively scanned by the optical projection system mounted on chassis 41 and carried by the continuously rotating turret 40, and are optically projected on viewing screen 18. Simultaneously with the projection operation, the outside surfaces of all plates 30 are being sequentially xerographically processed at station 50 as turret 31 rotates, to create new powder images of the current radar information. After a particular plate 30 has been thus processed, it is turned 180° on its vertical axis to substitute the new powder image for the old image in the sequence of images being scanned by the optical projection system 41.

It is apparent that the rotation of turrets 31 and 40, the rotation of prisms 47 and 60, the reciprocatory and oscillatory compound motion of carriage 32, and the periodic rotation of plates 30 when in the position of plate 30c, are preferably all accomplished from a single power source through an appropriate mechanical gear and linkage system. There are many modes of effecting this operation, which would be readily apparent to mechanics in this art.

Figure 3:
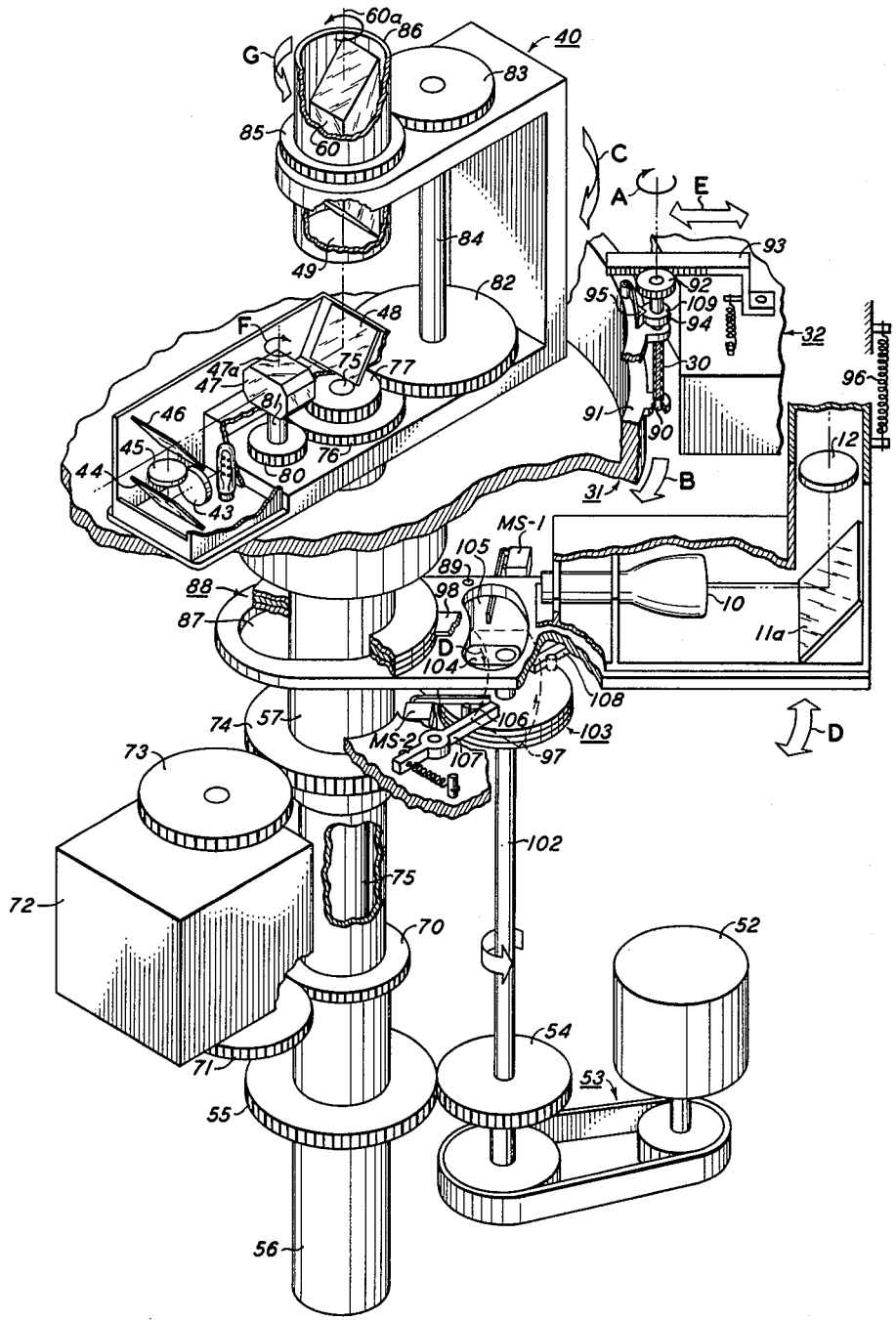
FIG. 3 is a schematic embodiment of a drive mechanism as may be employed with the apparatus of the invention.

A typical embodiment to effect the drive relationships, and which need not be the specific embodiment shown, will now be described with reference to FIG. 3. As there shown, the drive power emanates from a motor 52, which through belt and pulley arrangement 53 drives spur gear 54 on a shaft 102 meshing with spur gear 55 secured to a rotatable tubular shaft 56.

Turret 40 is secured to the upper end of shaft 56 to rotate coincident therewith and at a relatively greater rotational speed than that of turret 31. Turret 31 is coaxially mounted via a connecting hub 57 to rotate on suitable bearings independently about the top of shaft 56. Rotational speed of the turret 31 is effected by means of a drive which includes a shaft mounted spur gear 70 meshing with a spur gear 71 connected to the input of a speed reducer 72. The output of the speed reducer is conveyed from a spur gear 73 to a meshing spur gear 74 secured to the hub 57 causing rotation of the turret.

Rotation of prism 47 is achieved by means of a drive operative off a stationary shaft 75 supported vertically extended co-axially within shaft 56 and supporting at its uppermost end, two separate fixed and non-rotating gears 76 and 77. Gear 76 is engaged by a spur gear 80 secured in common with prism 47 to a shaft 81 rotatable in turret 40. As gear 80 revolves with turret 40 about the meshing with gear 76, prism 47 is caused to rotate in the direction F as shown by the arrow.

Prism 60, contained in a housing 86 mounted for rotation in turret 40, is likewise caused to rotate in the direction G by the rotational movement of a drive effected from spur gear 82 revolving in engagement with stationary gear 77. Gear 82 is secured in common with gear 83 to rotatable shaft 84 mounted in the turret 40. As gear 83 rotates, it rotates the housing by meshing with spur gear 85 secured to the housing supported for rotation in the turret.

Chassis 32, shown in disconnected parts for purposes of illustration, supports the elements for xerographic formation of the image from cathode ray tube 10 and is supported in turn about hub 57 through an elongated slot opening designated 87. Directional movement of the chassis is shown by the dashed outline, designated 97. To oscillate the chassis in the direction D in conjunction with the turret 31, there is provided a magnetic clutch 88 secured at its driven end to the turret hub 57 and having its free end engaging a dovetail slide 98 of the chassis. Energizing and deenergizing of the clutch is controlled by means of a downward dependent pin 89 extending from below the chassis to actuate microswitches MS-1 and MS-2, respectively. On actuating microswitch MS-1 as the pin moves therepast, the clutch is energized causing the chassis through slide 98 to effectively join the turret and oscillate together therewith. On completion of its arc of travel, as determined by microswitch MS-2, the clutch is deenergized permitting the chassis to be returned rapidly to the starting position by means of a high tension spring 96. By this means, the chassis is locked in to effect its oscillating arc of rotation in timed sequence with rotation of the turret.

Reciprocation of the chassis to effect the motion E is produced substantially at the termination of its motion D as above. Drive is obtained from the rotating shaft 102 supporting a mechanical one-half revolution slipclutch 103. Driven by the clutch in half revolution steps is a cam member 104 closely fit to engage an inside edge of opening 105 of the chassis. The clutch includes a single pin-stop 106 which when released causes the clutch to engage. The pin is normally held by either of a pair of spring biased pivoted bars 107 and 108 arranged 180° apart and which are pivoted outwardly to release the clutch pin by means of pin 89 in its course of movement in the oscillating cycle. The clutch operates rapidly causing the cam rise to bear against the opening edge in the direction in which movement is to result. As can be seen by referring to the motion path 97, clutch 103 is actuated in timed relation to the actuation of microswitches MS-1 and MS-2. Slide 98 maintains the chassis locked to clutch 88 and is in the inwardmost position when clutch 88 engages.

The xerographic plates 30 are pivotally supported on vertical pins 90 in angularly displaced openings 91 of the turret. Supported about the top pin is a one-way ratchet wheel 92 that is engaged by a spring biased rack 93 on the chassis 32 as the latter reciprocates toward the turret at station 16. As the chassis moves outwardly in the direction E following development, rack 93 causes the ratchet to rotate the plate 180° in the direction A. Rotatable in conjunction with the plate is a disk 94 having notches 109 on opposite sides arranged with its apex extending perpendicular relative to the surface of the plate and adapted to be engaged by a resilient mounted V-stop 95 to effect positioning of the plate and thus prevent override.

A specific illustration for adapting the above described system and invention to the processing of radar information obtained from a PPI radar presentation is here set forth. It is conventional for each 360° cycle of radar scan to take ten seconds. It is suggested that operation of the present system can be beneficially effected with twenty plates 30 on turret 31. If the turret 31 is rotated at a rate of one revolution each two hundred and ten seconds, then the turret is advanced one plate interval every ten and one-half seconds. The ten second radar scan cycle interval is adequate for each of the xerographic processing steps. The one-half second excess over the cycle scan time allows for the reciprocatory motion of the xerographic processing station housing and the plate charging time when charging and exposure are effected as one processing stage. A single scan cycle trace on the cathode ray tube 10 can be sufficient for proper xerographic exposure. For example, a sufficient light output from a single trace is obtained from a five inch cathode ray tube having a P-11 phosphor, and operating under the following conditions:

| | |
|---|---|
| Accelerating potential _____kv__ | 25 |
| Beam current _____$\mu$a__ | 80 |
| Spot size _____inch__ | 0.005 |
| Writing speed _____in./sec__ | 7000 |
| Magnification _____ | 1:1 |
| Lens aperture _____ | f/4.5 |

If the size of the xerographically recorded image is substantially less than the cathode ray tube image, obviously a correspondingly lower light output may be used.

Along with the foregoing time relationship, it is suggested that the optical projection turret 40 be rotated at a speed of 1.204 revolutions per second to scan the xerographic plates 30 at a rate of twenty-four plates per second. Obviously, then, a given complete sequence of images will be presented on the viewing screen approximately twelve times before the oldest image is changed to up-date the sequence and include the most current radar scan image. In order to compensate for the fact that the turrets 31 and 40 have a continuous motion relative to each other and to the stationary viewing screen 18, motion compensator prism 47 should be rotated at twelve revolutions per second, and dove prism 60 should be rotated at 0.602 revolution per second.

Having presented one specific embodiment of the present invention for the purpose of illustration, it will be apparent to those skilled in the art that numerous changes, variations, and modifications may be made. Accordingly, such changes, variations, and modifications as are embraced by the spirit and scope of the appended claims are contemplated as within the purview of the present invention.

What is claimed is:

1. A system for time compression display of a flow of successive units of visual information, comprising a plurality of elements adapted to erasably record said information, said elements having at least two recording areas, means mounting said elements for movement in a cyclical path, means for recording successive units of said information upon successive ones of said elements on one of the two recording areas thereof, means preceding said recording means in said cyclical path for erasing any prior recorded information from said one recording area, means for cyclically and repetitively scanning the other recording areas of said elements at a rate more rapid than the rate of flow of said units of information for presentation of successive units of information at a rate more rapid than the said flow thereof, and means for substituting said one recording area for said other recording area on each element following recordation of a unit of information on said other recording area thereof for continually up-dating the sequence of information presented by said scanning means.

2. A system as set forth in claim 1, wherein said elements are xerographic optical image responsive elements.

3. A system as set forth in claim 2, wherein said elements are flat plates, said two recording areas are separate xerographic optical image responsive layers located on opposite sides of said flat plates, and said substituting means is a means for rotating said plates 180°.

4. A system as set forth in claim 1, wherein said means mounting said elements is a circular turret, said scanning means is mounted internally of said turret for rotation on an axis coincident with that of said turret and includes means to present each unit of information in substantially the same position and orientation, said recording means and erasing means are mounted externally of said turret, said one recording area of each element faces outwardly of said turret, said other recording area of each element faces inwardly of said turret, and said substituting means includes means for reversing the relative location of said two recording areas.

5. In combination with a system as set forth in claim 1, a radar receiver having an optical radar image output means, said optical output means constituting an information input to said recording elements.

6. In the combination of claim 5, said recording elements being xerographic optical image responsive elements.

7. A method of time compression display of a continual flow of information, comprising the steps of separately and continually recording successive frames of said information to provide a chronological accumulation of information, continually substituting a current frame of information for the oldest frame of said accumulation of information, and continuously and repetitively scanning said accumulation of information and presenting successive frames of said accumulated information as recorded at a more rapid rate than the inflow of frames of information.

8. A method as set forth in claim 7, wherein said flow of information is in optical form, said recording of frames of information is done xerographically with each frame being recorded on a separate xerographic plate, and said scanning and presentation of accumulated information is done optically by projection by specular reflection of successive frames of information from the xerographic recordings.

9. A method as set forth in claim 8, wherein said substitution of a current frame of information for an old frame is done by substituting one xerographic plate for another.

References Cited in the file of this patent

UNITED STATES PATENTS

| | | |
|---|---|---|
| 1,735,037 | Carpe | Nov. 12, 1929 |
| 1,809,070 | Schapira | June 9, 1931 |
| 1,996,958 | Freund | Apr. 9, 1935 |
| 2,170,751 | Gabrilovitch | Aug. 22, 1939 |
| 2,860,179 | Blackstone | Nov. 11, 1958 |
| 3,007,009 | Miller | Oct. 31, 1961 |
| 3,044,045 | Kemp | July 10, 1962 |
| 3,109,060 | Beach et al. | Oct. 29, 1963 |